Jan. 21, 1958 J. D. WINTERS ET AL 2,820,577
POWDER FEED MECHANISM
Filed Dec. 3, 1953 3 Sheets-Sheet 1
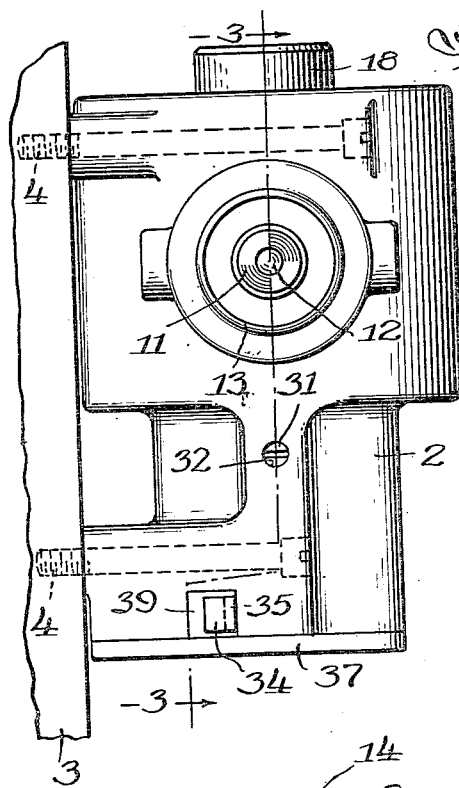
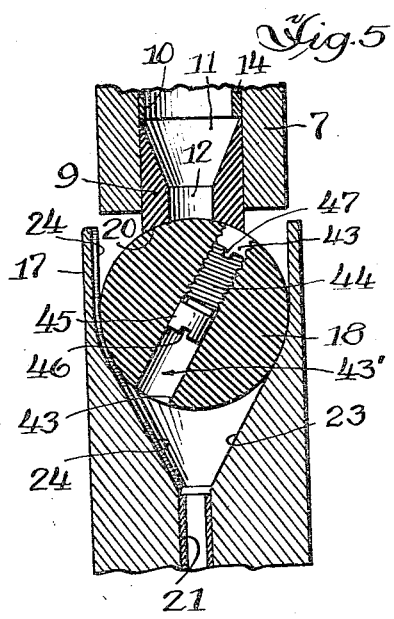
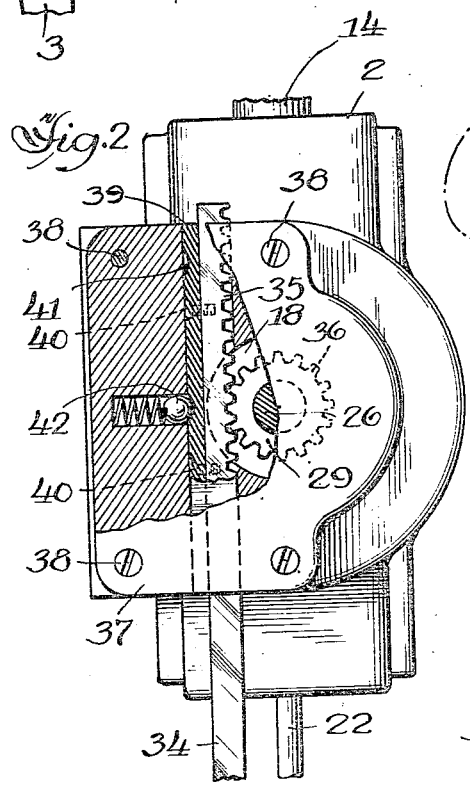
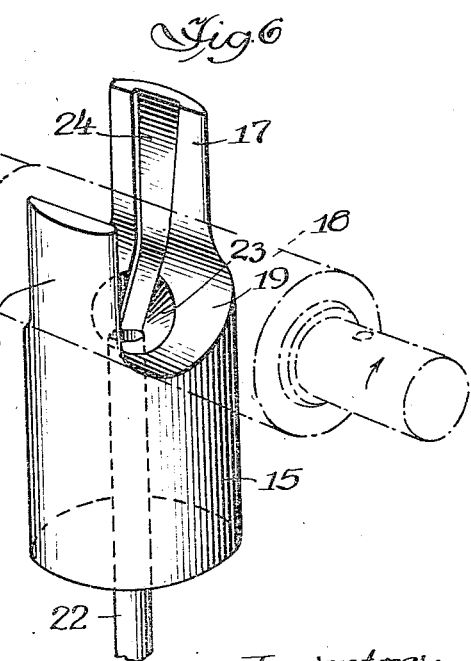
Inventors,
John D. Winters
and Arthur C. Nichols
By: Schneider & Dressler, Attys.

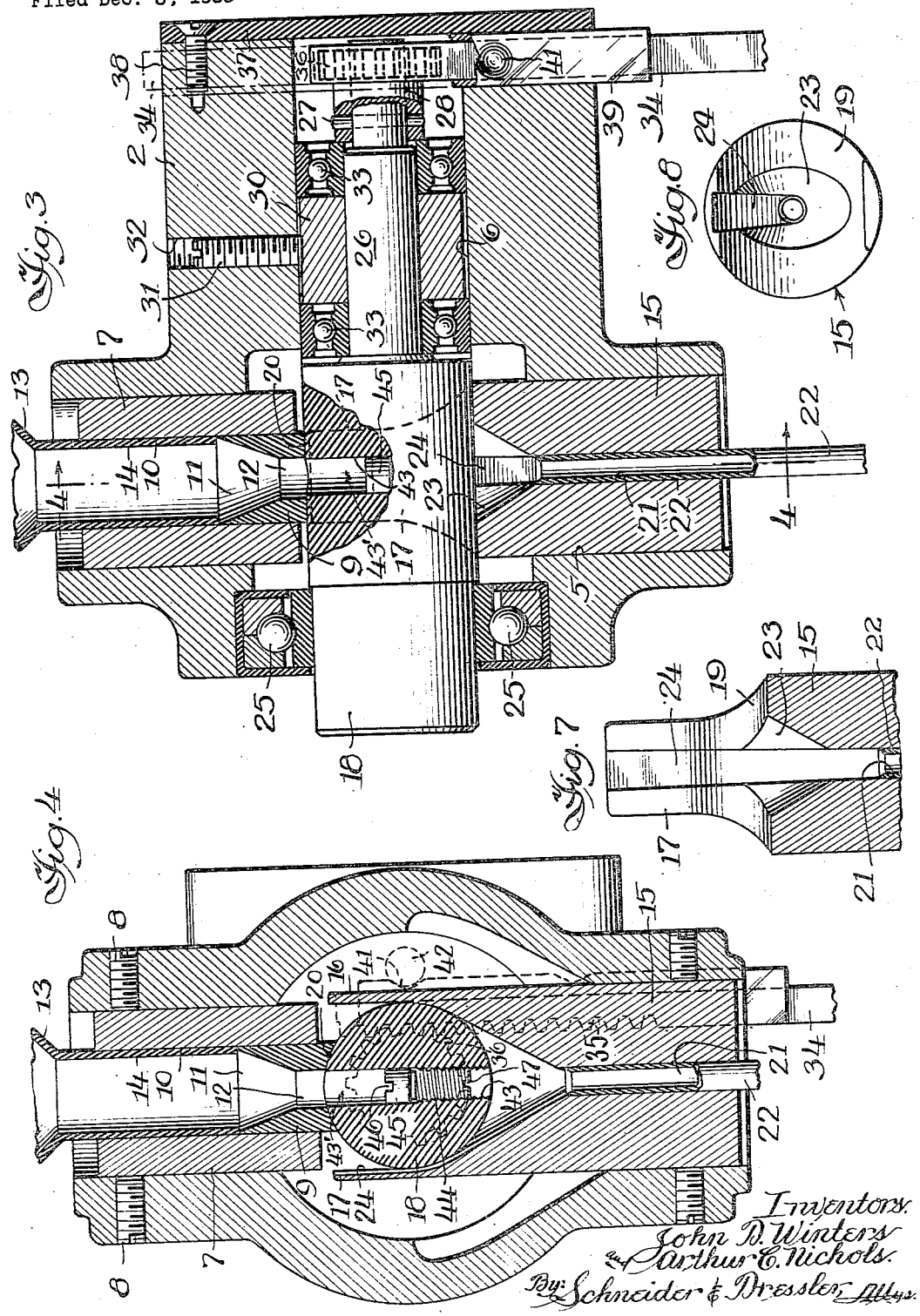

Jan. 21, 1958 J. D. WINTERS ET AL 2,820,577
POWDER FEED MECHANISM
Filed Dec. 3, 1953 3 Sheets-Sheet 3
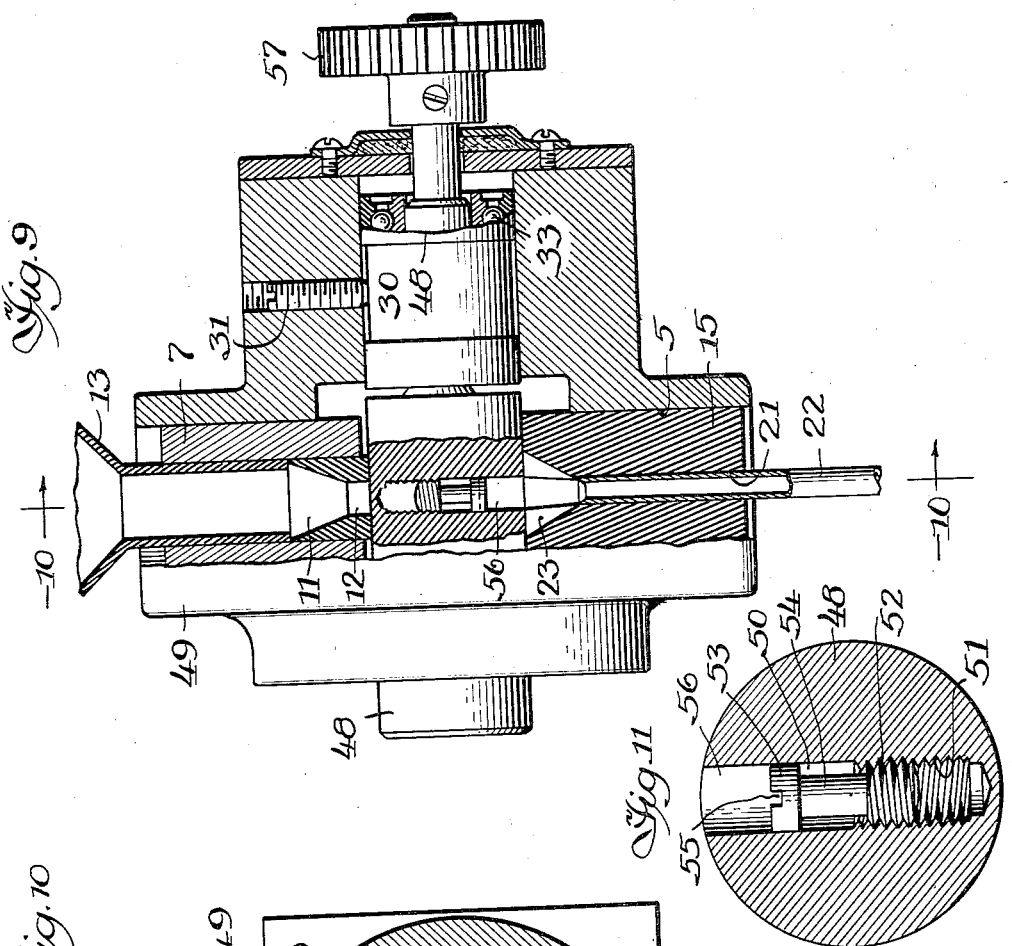
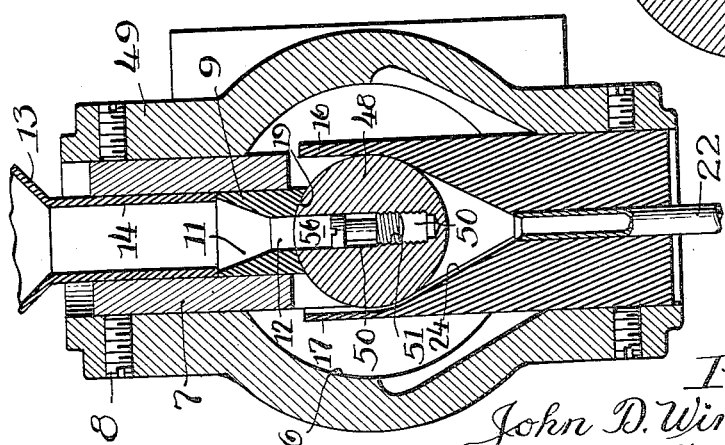
Inventors,
John D. Winters
and Arthur C. Nichols,
By: Schneider & Dressler, Attys.

2,820,577
Patented Jan. 21, 1958

United States Patent Office

2,820,577
POWDER FEED MECHANISM

John D. Winters, Lake Bluff, and Arthur C. Nichols, Waukegan, Ill., assignors to Fansteel Metallurgical Corporation, a corporation of New York Application December 3, 1953, Serial No. 395,891

9 Claims. (Cl. 222—306)

This invention relates to a powder feed mechanism for dispensing accurately measured quantities of powder from a hopper.

The rapid and accurate measurement of various kinds of powders is of practical advantage in the processing of electrical contacts, carbide tools and dies, and processes of similar nature in which the cost of the powder used is an important factor. It is also of extreme importance in the preparation of many medicines where slight variations in measurement of powders may seriously affect the quality of the resulting product. In many other processes such as loading cartridges or explosives of various types, it is also very desirable to control the powder content accurately.

In accordance with the present invention, we have devised a simple mechanism capable of rapidly measuring and dispensing accurately controlled quantities of powder, thus preventing any waste or contamination of the powder. Another advantage of the present mechanism is the ease and accuracy with which it may be adjusted to control the quantity of powder dispensed and the security with which any position of adjustment is maintained.

The structure by means of which the above and other advantages of the invention are attained will be described in detail in the following specification, taken in conjunction with the accompanying drawings, showing a preferred illustrative embodiment of the invention, in which:

Figure 1 is a top elevational view of a powder feed mechanism embodying the invention;

Figure 2 is a rear elevational view, with parts broken away to show part of the mechanism;

Figure 3 is a vertical sectional view, taken along the line 3—3 of Figure 1;

Figure 4 is a vertical sectional view, taken along the line 4—4 of Figure 3, showing the mechanism in the powder filling position;

Figure 5 is a fragmentary cross sectional view through the measuring mechanism in the powder dumping position;

Figure 6 is a detail perspective view of the outlet member with the measuring shaft shown in dotted lines;

Figure 7 is a fragmentary cross sectional view through the outlet member;

Figure 8 is a top plan view of the outlet member;

Figure 9 is a vertical view, partly in elevation and partly in section, through another embodiment of the invention, in which the horizontal shaft is continuously rotated in one direction by a motor;

Figure 10 is a vertical sectional view, taken along the line 10—10 of Figure 9; and Figure 11 is an enlarged cross sectional view through the horizontal shaft.

Referring to the drawings, the reference numeral 2 indicates a housing preferably in the form of a casting secured to a support 3 by means of bolts 4. The support may be of any suitable type; for example, it may be part of a machine adapted to process the powder dispensed from the feed mechanism, or may be independent of any machine. The outer shape of the housing is arbitrary and, if desired, it may be of any suitable exterior configuration as long as it is capable of housing the necessary parts of the powder feeding mechanism. The housing may be provided with supporting feet so that it may be supported on a table or bench in either fixed or movable position.

The housing is provided with a vertical bore 5 (Figure 3) and a horizontal bore 6 which intersect. The upper portion of vertical bore 5 is provided with a tubular insert 7 which is held in place by set screws 8. A plug 9 is drive-fitted into the bottom portion of an opening 10 in tubular insert 7 and its bottom is substantially flush with the upper edge of longitudinal bore 6. Plug 9 is provided with a funnel-shaped aperture 11 terminating at its lower end in a cylindrical aperture 12 extending through the bottom of plug 9. A hopper 13 having an integral hollow stem 14 has its stem positioned in opening 10 with the lower end of the stem in contact with the upper edge of plug 9 so that powder placed in hopper 13 will move downwardly freely into funnel-shaped aperture 11 and the cylindrical aperture 12. The powder is fed from the aperture 12 in a manner hereinafter described. Hopper 13 may be provided with any suitable cover (not shown) if it is desired to protect the powder against contamination.

An outlet member 15 is drive-fitted into the lower portion of vertical bore 5. The upper end of outlet member 15 is provided with oppositely disposed arms 16 and 17 (Figure 6) adapted to straddle a shaft 18 rotatably mounted in longitudinal bore 6, as hereinafter described. The upper edges of extensions 16 and 17 terminate in a horizontal plane substantially flush with the upper surface of shaft 18. The surface of outlet member 15 between and at the bottom of arms 16 and 17 is rounded concavely, as indicated at 19, to conform to the curvature of the outer surface of shaft 18 which it engages. The lower end of plug 9 also engages the outer surface of shaft 18 and is curved to conform to its curvature, as indicated at 20, Figures 4 and 5.

Outlet member 15 (Figure 3) is provided with an opening 21 in which a hollow stem or tube 22 is fitted. Tube 22 extends below and constitutes the passageway through which the powder is dispensed from the feeding mechanism. The upper portion of opening 21 is flared outwardly, as indicated at 23, to facilitate the passage of powder into tube 22. Arm 17 (Figure 7) is provided with a recess 24 having converging side walls which terminate at the upper end of tube 22. Recess 24 extends to the upper edge of arm 17.

Shaft 18 (Figure 3) is provided with bearings 25 suitably mounted adjacent the front end of housing 2. The rear end of shaft 18 is of reduced diameter, as indicated at 26, and is secured by means of a pin 27 to the hub 28 of a pinion gear 29 (Fig. 2) positioned in horizontal bore 6 adjacent its rear end. A spacer 30 positioned intermediate the length of the reduced portion 26 of shaft 18 is held in place by a set screw 31 threaded through an aperture 32 in housing 2. Bearings 33 are fitted in horizontal bore 6 between shaft portion 26 and housing 2 on each side of spacer 30.

A rack 34 (Figure 4) extends upwardly into housing 2 with its teeth 35 meshing with the teeth 36 of pinion 29. As illustrated in the drawings, rack 34 is fixed to a support, such as the stationary frame (not shown) of a machine. The frame part 3 of the machine, to which housing 2 is secured, is reciprocated vertically during the operation of the machine. It is obvious that the supporting members for housing 2 and rack 34 may be reversed, namely, that the housing may be fixed to a stationary support and the rack fixed to a movable machine part, For the proper operation of the dispenser of the present invention, it is essential that relative movement between housing 2 and rack 34 be provided in some manner. As these two members are moved relative to each other, teeth 35, which mesh with teeth 36, rotate pinion 29. The hub 28 of pinion 29, which is fixed to the reduced end 26 (Figure 3) of shaft 18 by means of pin 27, causes shaft 18 to rotate in horizontal bore 6. A back plate 37 is secured against the rear end of housing 2 by screws 38 to prevent disengagement of rack 34 and pinion 29. A strip 39 (Figure 2), secured to the back of rack 34 by screws 40, is provided with a pair of vertically spaced recesses 41. Housing 2 is provided with a spring-pressed ball 42 which fits into recesses 41 to provide an accurate stop to control the relative vertical movement between housing 2 and rack 34.

The intermediate portion of shaft 18 fits between the curved surface 19 and the bottom of plug 9. Shaft 18 is provided with a transversely extending bore 43 (Figure 4), threaded along a portion of its length from an internal region to one end thereof. A screw 44 threaded into bore 43 may be positioned anywhere within the opening to close the bottom of bore 43 and to provide a cavity 43'. The screw permits of a fine adjustment to control the capacity or volume of cavity 43'. Screw 44 has a slot 46 in head 45, and another slot 47 in its opposite end so that it may be adjusted from either end. Any suitable adjustable means for closing the bottom of bore 43 to provide cavity 43' may be used, but a screw is preferred because of the ease with which its position may be changed and the security with which it is held against accidental displacement.

The bore 43 may extend entirely through shaft 18, or it may extend only part way through to provide a cavity of fixed volume or capacity. Adjustable means, such as screw 52 may be positioned within a bore which does not extend entirely through the shaft to provide means for varying its capacity as shown in Figure 11.

The vertical reciprocation of the housing 2 acts through rack 34 to oscillate shaft 18 between the powder filling position of Figure 4 and the powder dumping position of Figure 5. Power fed from hopper 13 through funnel 11 by gravity falls into cavity 43' as the rotation of shaft 18 brings the shaft into powder filling position, in which cavity 43' is aligned vertically with opening 12. Shaft 18 is stopped in this position by the interengagement of spring-pressed ball 42 with the upper recess 41, which occurs simultaneously with the termination of the downward movement of housing 2.

Rotation of shaft 18 in the opposite direction, as housing 2 starts its upward movement, causes the peripheral surface of shaft 18 on the right hand side of cavity 43', as viewed in Figure 4, to engage the bottom of plug 9, thereby cutting off the downward movement of powder after cavity 43' has been completely filled. As shaft 18 continues to rotate, cavity 43' approaches a horizontal plane and the powder is dumped therefrom. Rotation of shaft 18 is continued past ninety degrees to insure dumping of all the powder from cavity 43', but is stopped before one hundred and eighty degrees to prevent any powder from falling from funnel 11 into the portion of opening 43 on the side of screw 44 opposite to cavity 43'. The recess 24 is aligned transversely with cavity 43' so that the powder dumped from cavity 43' falls into the recess and moves downwardly by gravity through tube 22 into a suitable mold or receptacle (not shown) positioned below the open bottom end of the tube. Since the rotation of shaft 18 is controlled by the relative movement between gear 29 and rack 34, the cycle of movement of the powder from the hopper is synchronized with the machine to which the powder feed mechanism is connected, so that the powder is dispensed through tube 22 at definite, predetermined intervals. This synchronization is important where the molds or other receptacles for receiving the powder from tube 22 move relative to said tube.

The cut-off between cavity 43' and plug 9 is precise so that the quantity of powder in cavity 43' may be regulated with extreme accuracy merely by turning screw 44 in either direction. As shown in Figures 6 and 7, recess 24 is tapered in width, the upper portion being wider than opening 43 so that powder dumped out of cavity 43' must fall within the confines of recess 24. If the powder were not confined to the recess 24, some might get between shaft 18 and surface 19 and not only impair the accuracy of measurement, but also cause abrasion of the shaft 18 or surface 19.

In the embodiment of the invention shown in Figures 9–11, much of the structure is a duplicate of the embodiment described above, and the description thereof will not be repeated. The essential differences between the two embodiments are the specific structure of the shaft 48 which replaces shaft 18, and the means for rotating shaft 48. In this embodiment, the gear 29 and the rack 34 are omitted, and the housing 49, which replaces housing 2, does not reciprocate as in the previous embodiment.

The shaft 48 is provided with a transverse bore 50, similar to bore 43 except that it does not extend completely through the shaft. The inner end position of bore 50 is threaded, as indicated at 51, Figure 11. A screw 52 has one end threaded to engage the threads 51 and the other end has an enlarged head 53, joined to the first end by a reduced neck portion 54. Head 53 is provided with a slot 55 to receive a screw driver or similar tool so that it may be easily rotated to regulate the capacity of the powder cavity 56 comprising the portion of bore 50 between head 53 and the open end of bore 50.

A gear 57, mounted on the end of shaft 48, is operatively connected with a motor (not shown) in any suitable manner, and is rotated continuously as long as the motor is operating. As the cavity 56 is aligned with aperture 12, it is filled with powder which it starts dumping into recess 24 upon rotation of shaft 48 when the cavity has been rotated approximately forty-five degrees from the filling position shown in Figure 10. The cavity is completely emptied by the time it reaches the position shown in Figure 9, in which it is aligned vertically with tube 22.

Although we have described two preferred embodiments of the invention in considerable detail, it will be understood that the description thereof is intended to be illustrative rather than restrictive, as many details may be modified or changed without departing from the spirit or scope of the appended claims. Accordingly, we do not desire to be restricted to the exact details of construction described.

We claim:

1. A powder feed mechanism comprising a hopper having an open bottom, an outlet member positioned below said open bottom, said outlet member being provided with upwardly extending arms at opposite edges thereof, one of said arms being provided with a vertically extending recess, a horizontally disposed shaft rotatably mounted between said arms with its periphery engaging the open bottom of said hopper to form a cutting edge, said shaft having a transversely extending cavity, and adjustable means closing one end of said cavity, said cavity being aligned with the open bottom of said hopper and said outlet member during rotation of the shaft, whereby powder is discharged from said hopper into said cavity and dumped from said cavity into said outlet member.

2. A powder feed mechanism comprising a hopper having an open bottom, an outlet member positioned below said open bottom, said outlet member being provided with upwardly extending arms at opposite edges thereof, one of said arms being provided with a vertically extending recess, a horizontally disposed shaft rotatably mounted with its periphery in engagement with both the open bottom of said hopper, to form a cutting edge, and the inner surfaces of said arms; said outlet member having a vertical opening extending therethrough, said recess extending upwardly from said vertical opening, said shaft having a cavity alternately aligned with the open bottom of said hopper, said recess in said one of said arms and said vertical opening during rotation of said shaft, whereby a measured quantity of powder pours from said hopper into said cavity when said shaft opening is aligned with the bottom end of said hopper and from said cavity into said vertical opening in the outlet member when said shaft is aligned with it and said recess.

3. A powder feed mechanism comprising a hopper having an open bottom, an outlet member positioned below said open bottom, said outlet member being provided with upwardly extending arms at opposite edges thereof, a horizontally disposed shaft rotatably mounted between said arms with its periphery in engagement with the bottom end of said hopper and at least a portion of the inner surface of each of said arms, one of said arms being provided with a vertically extending recess, said outlet member having a vertical opening extending from the lower end of said recess through said outlet member, said shaft having a transverse cavity aligned with the open bottom of said hopper when in vertical position, whereby powder pours from said hopper into said cavity, adjustable means for regulating the capacity of said cavity to control the quantity of powder received by said cavity from said hopper when they are aligned, means for rotating said shaft to move the top of said cavity opening toward said recess, whereby said powder is dumped from said cavity into said recess as the rotation of said shaft from said vertical position exceeds forty-five degrees, said cavity being in alignment with said recess when the cavity is rotated in the region of the recess.

4. A powder feed mechanism comprising: a hopper having an open bottom; an outlet member positioned below said open bottom, said outlet member having upwardly extending arms at opposite edges thereof and having an opening therethrough substantially in alignment with the opening in the bottom of the hopper; a horizontally disposed shaft rotatably mounted between said arms with its periphery in contact with the edges forming the open bottom of said hopper and with at least a portion of the inner surface of each of said arms, said shaft having a transverse cavity aligned with the open bottom of said hopper when in a vertical feed position whereby powder flows from said hopper into said cavity, and one of said arms having a recess extending upwardly from the opening in the outlet member to a point on the arm at least 90° in rotation upwardly of a point on the shaft from alignment with the opening in the outlet member; adjustable means for regulating the capacity of said cavity; and means for rotating said shaft to move the top of said cavity opening downwardly toward said recess to dump substantially all of the powder from said cavity into the opening in the outlet member, the top of said cavity opening and the recess being in alignment when the cavity opening is rotated through the region of the recess.

5. A powder feed mechanism comprising: a hopper having an open bottom; an outlet member positioned below said open bottom, said outlet member having upwardly extending arms at opposite edges thereof and having an opening therethrough substantially in alignment with the opening in the bottom of the hopper; a horizontally disposed shaft rotatably mounted between said arms with its periphery in contact with the edges forming the open bottom of said hopper and with at least a portion of the inner surface of each of said arms, said shaft having a transverse cavity aligned with the open bottom of said hopper when in a vertical feed position whereby powder flows from said hopper into said cavity, and one of said arms having a recess extending upwardly from the opening in the outlet member to a point on the arm at least 90° in rotation upwardly of a point on the shaft from alignment with the opening in the outlet member, said recess being at least equal in width to the diameter of the cavity, and the top of said cavity opening and the recess being in alignment when the cavity opening is rotated through the region of the recess.

6. A powder feed mechanism comprising: a hopper having an open bottom; an outlet member positioned below said open bottom, said outlet member having upwardly extending arms at opposite edges thereof and having an opening therethrough substantially in alignment with the opening in the bottom of the hopper; a horizontally disposed shaft rotatably mounted between said arms with its periphery in contact with the edges forming the open bottom of said hopper to form a cutting edge and with at least a portion of the inner surface of each of said arms, said shaft having a transverse cavity extending therethrough and aligned with the open bottom of said hopper when in a vertical feed position whereby powder flows from said hopper into said cavity, and one of said arms having a recess extending upwardly from the opening in the outlet member to a point on the arm at least 90° in rotation upwardly of a point on the shaft from alignment with the opening in the outlet member; adjustable means closing one end of said cavity for regulating the capacity of said cavity; means for rotating said shaft to move the top of said cavity opening downwardly toward said recess to dump substantially all of the powder from said cavity into the opening in the outlet member, the top of said cavity opening and the recess being in alignment when the cavity opening is rotated through the region of the recess.

7. A powder feed mechanism comprising: a hopper having an open bottom; an outlet member positioned below said open bottom, said outlet member having upwardly extending arms at opposed edges thereof and having an opening therethrough substantially in alignment with the opening in the bottom of the hopper; a horizontally disposed shaft rotatably mounted between said arms with its periphery in contact with the edges forming the open bottom of said hopper to form a cutting edge and with at least a portion of the inner surface of each of said arms, said shaft having a transverse cavity aligned with the open bottom of said hopper when in a vertical feed position whereby powder flows from said hopper into said cavity, and one of said arms having a recess extending upwardly from the opening in the outlet member beyond a point on the arm at least 90° in rotation upwardly of a point on the shaft from alignment with the opening in the outlet member; adjustable means for regulating the capacity of said cavity; and means for rotating said shaft to move the top of said cavity downwardly toward said recess and to dump substantially all of the powder from said cavity into the opening in the outlet member, said recess having side walls converging downwardly toward the opening in the outlet member, the top portion of said recess being greater in width than the diameter of said transverse cavity, and the top of said cavity opening and the recess being in alignment when the cavity opening is rotated through the region of the recess.

8. A powder feed mechanism comprising: a hopper having an open bottom; an outlet member positioned below said open bottom, said outlet member having upwardly extending arms at opposite edges thereof and having an opening therethrough substantially in alignment with the opening in the bottom of the hopper; a horizontally disposed shaft rotatably mounted between said arms with its periphery in contact with the edges forming the open bottom of said hopper to form a cutting edge and with at least a portion of the inner surface of each of said arms, said shaft having a transverse cavity therethrough aligned with the open bottom of said hopper when in a vertical feed position whereby powder flows from said hopper into said cavity, and one of said arms having a recess extending upwardly from the opening in the outlet member to a point on the arm at least 90° in rotation upwardly of a point on the shaft from alignment with the opening in the outlet member; adjustable means for regulating the capacity of said cavity; and means for rotating said shaft to move the top of said cavity opening downwardly toward said recess to an angle of rotation from the open bottom of the hopper of from 90° to less than 180° to dump substantially all of the powder from said cavity into the opening in the outlet member, the top of said cavity opening and the recess being in alignment when the cavity opening is rotated through the region of the recess.

9. A powder feed mechanism, comprising: a hopper having an open bottom; an outlet member positioned below said open bottom, said outlet member being provided with upwardly extending arms at opposite edges thereof; a horizontally disposed shaft rotatably mounted between said arms with its periphery in engagement with the bottom end of said hopper and at least a portion of the inner surface of each of said arms, one of said arms being provided with a vertically extending recess, said outlet member having a vertical opening extending from the lower end of said recess through said outlet member, said shaft having a transverse cavity aligned with the open bottom of said hopper when in vertical position, whereby powder pours from said hopper into said cavity; and means for rotating said shaft to move the top of said cavity opening toward said recess, whereby said powder is dumped from said cavity into said recess, said cavity being in alignment with said recess when the cavity is rotated in the region of the recess.

References Cited in the file of this patent
UNITED STATES PATENTS

| | | |
|---|---|---|
| 545,583 | Elward | Sept. 3, 1895 |
| 2,567,282 | Gardner et al. | Sept. 11, 1951 |
| 2,648,477 | Harrington | Aug. 11, 1953 |
| 2,692,068 | Worswick | Oct. 19, 1954 |

U. S. DEPARTMENT OF COMMERCE
PATENT OFFICE

CERTIFICATE OF CORRECTION

Patent No. 2,820,577                      January 21, 1958

John D. Winters et al.

It is hereby certified that error appears in the printed specification of the above numbered patent requiring correction and that the said Letters Patent should read as corrected below.

Column 4, line 65, after "hopper" insert -- , said recess in said one of said arms --.

Signed and sealed this 18th day of March 1958.

(SEAL)
Attest:

KARL H. AXLINE
Attesting Officer

ROBERT C. WATSON
Commissioner of Patents